United States Patent [19]
Dick et al.

[11] Patent Number: 5,636,057
[45] Date of Patent: Jun. 3, 1997

[54] PRISMATIC TOROIDAL LENS AND TRAFFIC SIGNAL LIGHT USING THIS LENS

[75] Inventors: Georges P. Dick, Outremont; Marc Hoffman, Montréal, both of Canada

[73] Assignee: Ecolux Inc., Lachine, Canada

[21] Appl. No.: 386,548

[22] Filed: Feb. 10, 1995

[51] Int. Cl.⁶ .................................................. G02B 27/10
[52] U.S. Cl. .............................................. 359/625; 359/455
[58] Field of Search ...................................... 359/570, 574, 359/625, 455

[56] References Cited

U.S. PATENT DOCUMENTS

| | | | |
|---|---|---|---|
| 4,998,806 | 3/1991 | Tsuji et al. | 350/452 |
| 5,081,545 | 1/1992 | Sugawara et al. | 359/625 |
| 5,119,235 | 6/1992 | Umeda et al. | 359/619 |
| 5,139,609 | 8/1992 | Fields et al. | 359/641 |
| 5,174,649 | 12/1992 | Alston | 362/244 |
| 5,343,330 | 8/1994 | Hoffman et al. | 359/708 |
| 5,345,336 | 9/1994 | Aoyama et al. | 359/628 |
| 5,436,764 | 7/1995 | Umetani et al. | 359/566 |

*Primary Examiner*—Georgia Y. Epps
*Assistant Examiner*—Thomas Robbins

[57] ABSTRACT

A traffic signal light comprises an array of light-emitting diodes for producing respective light rays, and an array of lenses for propagating light rays from the light-emitting diodes toward a plurality of predetermined, distinct spatial points. The lenses are each associated with a corresponding one of the light-emitting diodes, and each lens comprises a solid body of light-propagating material defining a light-refracting surface through which the light rays from the corresponding light-emitting diode propagate. The light-refracting surface is divided into distinct light-refracting surface sections each associated to a corresponding one of the spatial points. The light-refracting surface sections have different configurations in view of deviating the light rays propagating therethrough toward the associated spatial points, respectively. Therefore, at each spatial point add the light rays deviated by the associated light-refracting surface sections of the different lenses.

20 Claims, 7 Drawing Sheets

Fig. 16

PRISMATIC TOROIDAL LENS AND TRAFFIC SIGNAL LIGHT USING THIS LENS

BACKGROUND OF THE INVENTION

1. Field of the Invention

The present invention relates to an apparatus, for example a traffic signal light, using an array of lenses each comprising a solid body of light-propagating material defining a light-refracting surface through which the light rays from a light source propagate. The light-refracting surface is divided into light-refracting surface sections having different configurations in view of deviating the light rays propagating through these surface sections toward respective spatial points.

In the present disclosure and in the appended claims, the term "configuration" is intended to designate the shape, orientation and position of the light-refracting surface sections.

2. Brief Description of the Prior Art

U.S. Pat. No. 5,343,330 (Hoffman et al.) issued on Aug. 30, 1994 describes a traffic signal light comprising an array of light-emitting diodes. This prior art traffic signal light also comprises an array of generally conical, double-refraction and total reflection solid nonimaging lenses for refracting, reflecting and thereby redirecting the light rays from the diodes in view of meeting with the requirements of the standard in force in the region of concern relative to traffic signal lights.

A drawback of the double-refraction and total reflection solid nonimaging lenses of U.S. Pat. No. 5,343,330 is that a complex geometry may be required to respect the standard.

OBJECTS OF THE INVENTION

An object of the present invention is to eliminate the above discussed drawback of the prior art lenses and traffic signal lights.

Another object of the present invention is a solid nonimaging lens capable of refracting and thereby deviating light rays from a light source in accordance with the requirements of the traffic signal light standard to be met in the region of concern.

SUMMARY OF THE INVENTION

More specifically, in accordance with the present invention, there is provided an apparatus for propagating light rays toward a plurality of predetermined, distinct spatial points, comprising:

an array of light sources for producing respective light rays; and an array of lenses each associated with a corresponding one of the light sources, wherein (a) the lenses each comprise a solid body of light-propagating material defining a light-refracting surface through which the light rays from the corresponding light source propagate, (b) the light-refracting surface is divided into light-refracting surface sections each associated with a corresponding one of the spatial point, and (c) the light-refracting surface sections have different configurations in view of deviating the light rays propagating through the light-refracting surface sections toward the corresponding spatial points, respectively.

The lenses comprise a plurality of light-refracting surface sections associated to each spatial point whereby the light rays deviated by this plurality of light-refracting surface sections add at the associated spatial point.

In the present disclosure and in the appended claims, the expression "spatial point" is intended to designate a spatial zone or region toward which the light rays propagate.

The present invention is further concerned with a traffic signal light comprising:

an array of light-emitting diodes for producing respective light rays; and an array of lenses for propagating light rays from the light-emitting diodes toward a plurality of predetermined, distinct spatial points, wherein (a) the lenses of the array are each associated with a corresponding one of the light-emitting diodes, (b) the lenses each comprise a solid body Of light-propagating material defining a light-refracting surface through which the light rays from the corresponding light-emitting diode propagate, (c) the light-refracting surface is divided into light-refracting surface sections each associated with a corresponding one of the spatial points, and (d) the light-refracting surface sections have different configurations in view of deviating the light rays propagating through the light-refracting surface sections toward the corresponding spatial points, respectively.

Again, the lenses comprise a plurality of light-refracting surface sections associated to each spatial point whereby the light rays deviated by this plurality of light-refracting surface sections add at the associated spatial point.

According to preferred embodiments of the invention:

the light-refracting surface has short radius and long radius concave cross sections lying in respective, substantially perpendicular planes;

the light-refracting surface is both prismatic and toroidal;

the light-refracting surface sections have different dimensions to adjust the light intensity at each spatial point;

the solid body defines on the side of the corresponding light source a light-collimating surface for collimating the light rays from the corresponding light source, and the light-refracting surface is situated on the side of the solid body opposite to the corresponding light source;

the light-collimating surface is convex and the light-refracting surface is concave;

the array of lenses is a one-piece array made of molded plastic material and the lenses define a honeycomb arrangement;

the light-refracting surface is formed of a central region and an annular region surrounding the central region, the light-refracting surface sections being distributed on both the central and annular regions of the light-refracting surface;

the annular regions of the light-refracting surfaces of the different lenses are identical, and the light-refracting surfaces of the lenses comprise different types of central regions distributed over the array of lenses; and the central region of the light-refracting surface of each lens protrudes from the annular region of the same light-refracting surface;

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Although the preferred embodiment of the present invention is concerned with a traffic signal light, the present invention should not be understood as being limited to this particular application.

In the appended drawings, the preferred embodiment of the traffic signal light in accordance with the present invention is generally identified by the reference 10.

Figure 1:
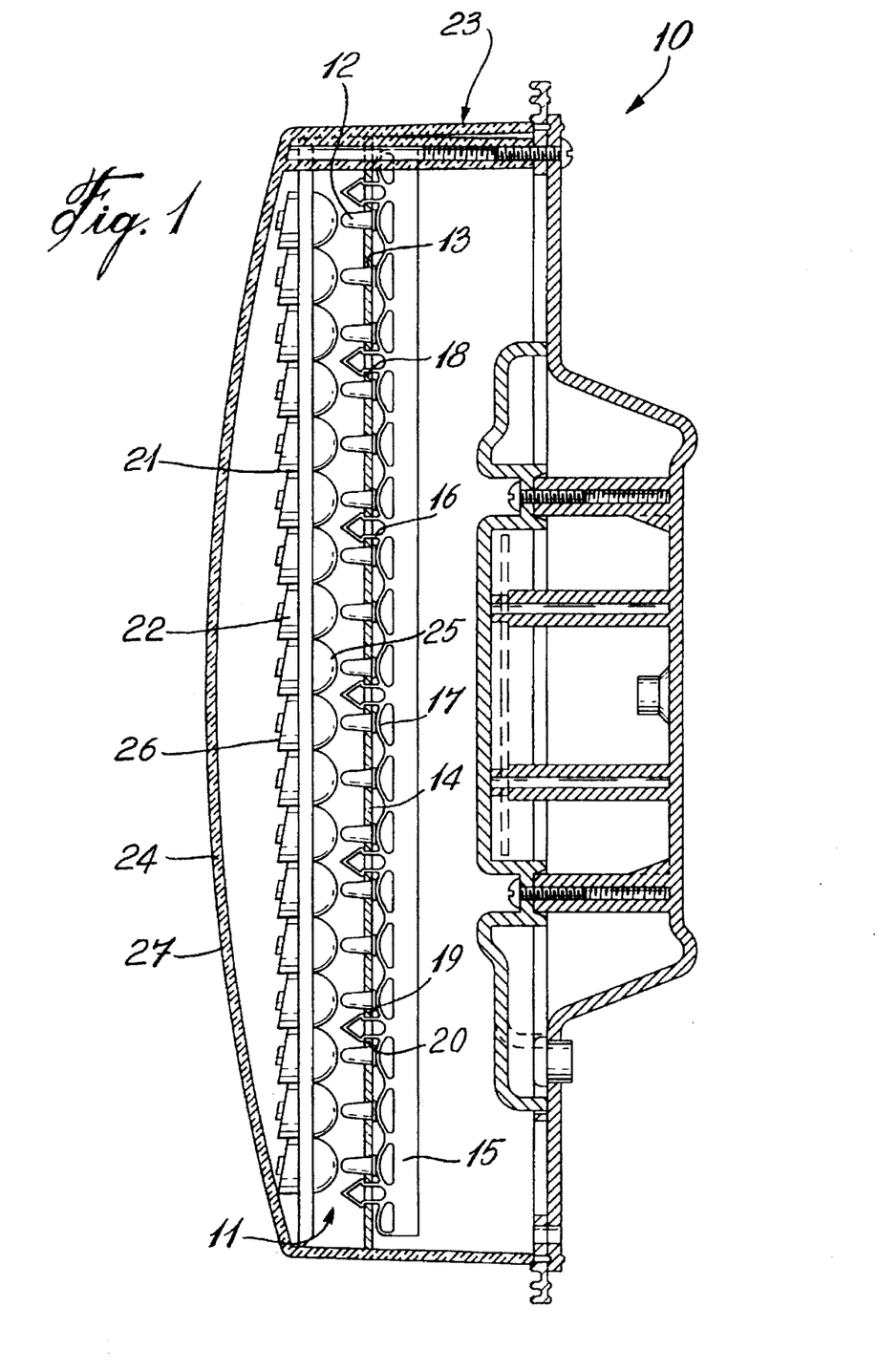
FIG. 1 is a cross sectional, side elevational view of a traffic signal light comprising an array of light-emitting diodes and an array of prismatic toroidal nonimaging lenses in accordance with the present invention.

As illustrated in FIG. 1 of the appended drawings, the traffic signal light 10 comprises an array 11 of light-emitting diodes such as 12.

To form the array 11, the diodes 12 are mounted into holes such as 13 of a diode-mounting board 14. Each column of diodes 12 are retained in the associated holes 13 by means of a flat diode-holding bar such as 15 (FIG. 1). Each bar 2 is made of plastic material and is formed with integral hollow deformable arrow-shaped fasteners such as 16 and integral arcuate convex deformable pressure-applying members such as 17.

The board 14 is formed with rectangular holes such as 18 to receive the respective arrow-shaped fasteners 16 upon installation, the diodes 12 of a column are first inserted in the respective holes 13 of the board 14 and then the arrow-shaped fasteners 16 of the diode-holding bar 15 are pushed into the respective holes 18. The hollow arrow-shaped fasteners 16 deform until the barbs 19 and 20 thereof are situated on the opposite side of the board 14. The arrow-shaped fasteners 16 then return to their original shape to thereby hook the bar 15 to the board 14. The arcuate, convex members 17 then apply pressure to the respective light-emitting diodes 12 to retain these diodes in the associated holes 13 of the board 14.

Figure 2:
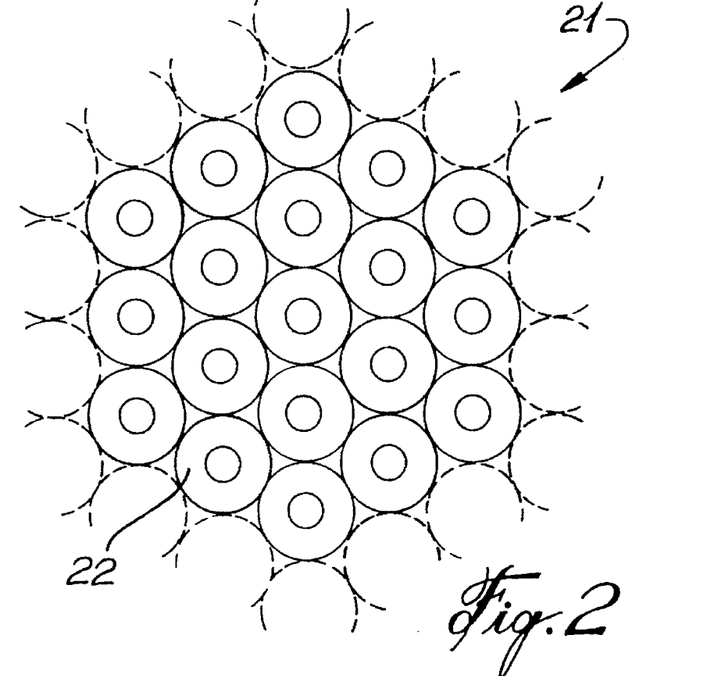
FIG. 2 is a partial, front elevational view of the array of prismatic toroidal nonimaging lenses of the traffic signal light of FIG. 1.

Referring to FIGS. 1 and 2, the traffic signal light 10 also comprises an array 21 of prismatic toroidal nonimaging lenses such as 22 each associated with a corresponding one of the light-emitting diodes 12 for propagating the light rays from that associated diode 12. As shown in FIGS. 1 and 2, the array 21 of lenses 22 forms a one-piece prismatic plate preferably made of molded plastic material. As illustrated in FIG. 2, the lenses 22 are disposed adjacent to each other in the array 21 in accordance with a honeycomb arrangement.

The arrays 11 and 21 of light-emitting diodes 12 and lenses 22 are mounted into a housing 23 comprising a front wall 24 made of light-propagating material. For example, the light-propagating material of the front wall 24 is red when the traffic signal light is a red traffic signal light. Also, the front wall 24 defines a continuous, smooth outer surface 27. Surface 27 may be flat, or convex as illustrated in FIG. 1. Of course, the continuous, smooth outer surface 27 will greatly facilitate cleaning of the traffic signal light 10. The design of the housing 23 is believed to be otherwise within the capacity of one of ordinary skill in the art and accordingly will not be further described.

Each lens 22 comprises a solid body of light-propagating material defining, on the side of the corresponding light-emitting diode 12, an inner light-refracting Surface such as 25 (FIGS. 1, 4 and 5) and, on the side opposite to the corresponding diode 12, an outer light-refracting surface such as 26 (FIGS. 1, 3, 4 and 5). As it will be described in the following description, the light rays from the corresponding light-emitting diode 12 propagate through both the inner 25 and outer 26 light-refracting surfaces.

Figure 6:
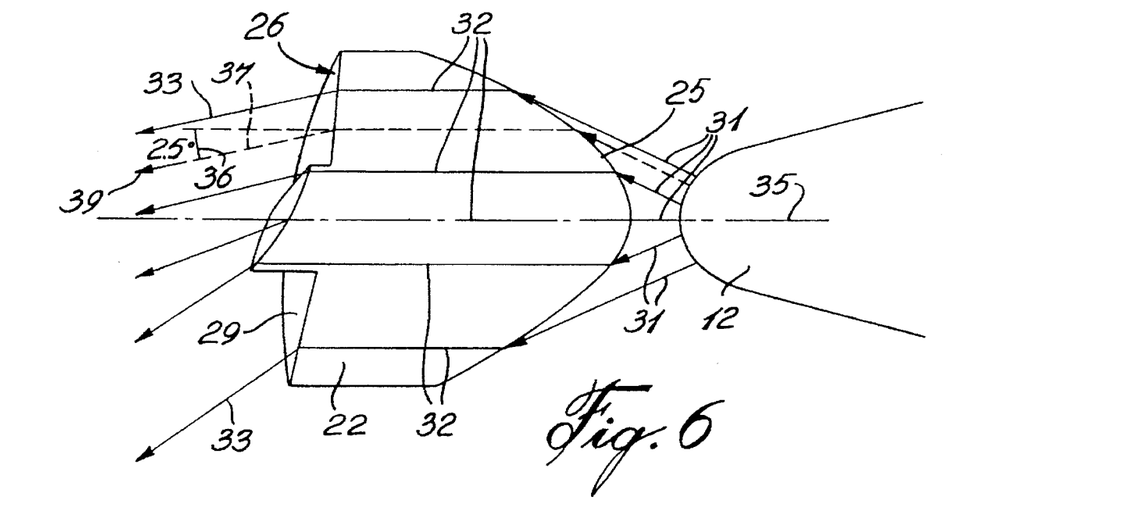
FIG. 6 is a side elevational view of the lens of FIGS. 3–5, showing propagation of the light rays produced by a light-emitting diode therein.
Figure 7:
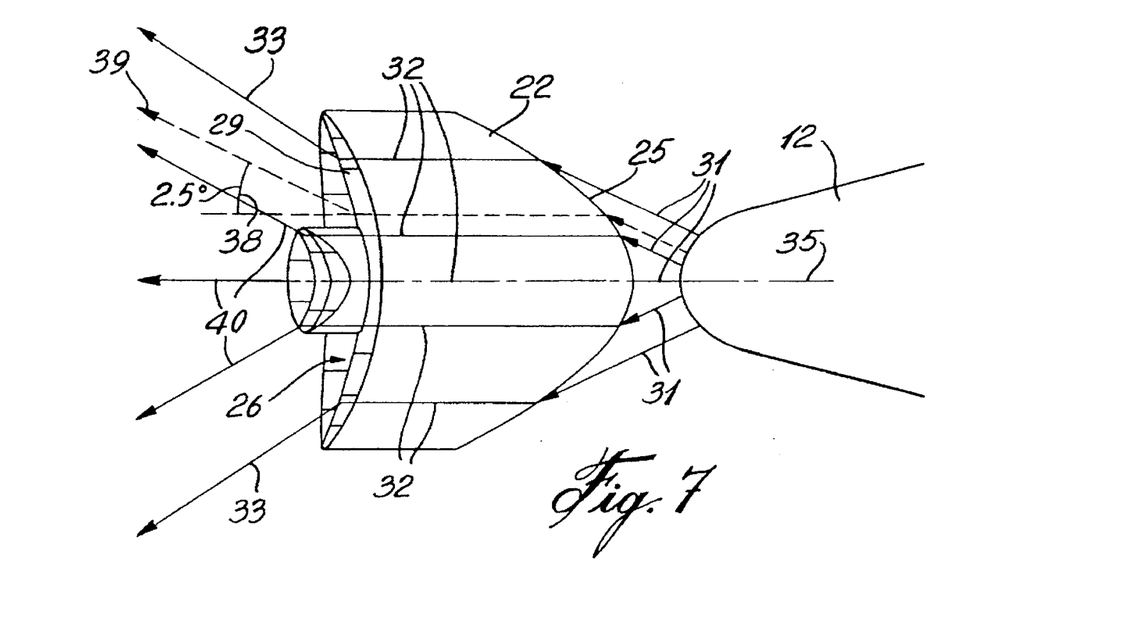
FIG. 7 is a top plan view of the lens of FIGS. 3–5, showing propagation of the light rays produced by a light-emitting diode therein.

Referring to FIGS. 6 and 7, the inner light-refracting surface 25 of each lens 22 is generally parabolic to collimate the light rays such as 31 from the associated light-emitting diode 12 into a beam of parallel light rays such as 32 propagating though the solid body of the lens 22. Surface 25 therefore constitute a light-collimating surface.

Referring back to FIGS. 3–5, the outer light-refracting surface 26 of each lens 22 is formed of a central region 28 and an annular region 29 surrounding the central region 28. Because of the nature of the light emitting process that takes place within a light-emitting diode, the light density of the collimated beam (parallel light rays 32) produced by the light-refracting surface 25 is not constant radially. Therefore, as will be described in the following description, better results are achieved by dividing the light-refracting surface 26 of each lens 22 in two concentric areas (central region 28 and annular region 29) having an approximately constant light density.

Figure 3:
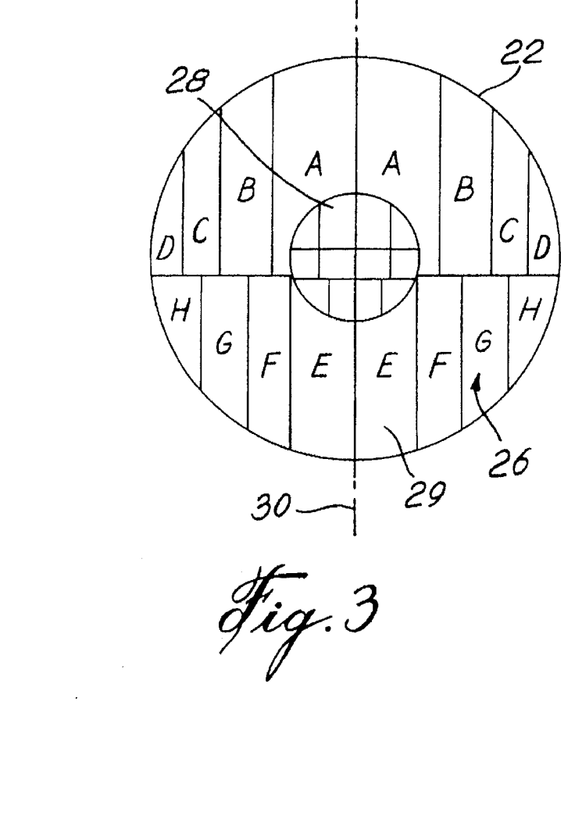
FIG. 3 is a front elevational view of a lens of the array of prismatic toroidal nonimaging lenses of the traffic signal light of FIG. 1, comprising an outer light-refracting surface formed of a central region and an annular region surrounding the central region.

The annular region 29 has a short radius concave cross section (FIG. 5) lying in a horizontal plane and a long radius concave cross section (FIG. 4) lying in a vertical plane. Also, each annular region 29 comprises an upper row and a lower row of light-refracting surface sections. More specifically, each annular region is divided into left upper light-refracting surface sections A–D, into right upper light-refracting surface sections A–D, into left lower light-refracting surface sections E–H, into right lower light-refracting surface sections E–H. As illustrated in FIG. 3, the left light-refracting surface sections A–H are symmetrical With respect to the right light-refracting surface sections A–H about a vertical central plane 30. Each lens 22 is therefore a multiple section prismatic toroidal lens.

As illustrated in FIGS. 6 and 7, the short and long radius concave cross sections of each annular region 29, lying in respective horizontal and vertical planes, deviate the parallel light rays 32 propagating therethrough by refraction in view of forming a divergent light beam of larger horizontal dimension (see light rays 33 in FIG. 7) and of smaller vertical dimension (see light rays 33 in FIG. 6). More specifically, the left and right light-refracting surface sections A–H of the annular region 29 are respectively associated to predetermined, distinct spatial points and have different configurations (shape, orientation and position) in view of deviating the light rays 13 propagating through these left and right light-refracting surface sections A–V toward the corresponding spatial points, respectively. These predetermined spatial points are given by a standard to meet, for example the Standard for Traffic Signal Lamps of the Institute of Transportation Engineers given by the following Table 1:

| VERTICAL ANGLE DOWN | HORIZONTAL ANGLE (LEFT & RIGHT) | UNIT CANDLE-POWER | LIGHT-REFRACTING SURFACE SECTION |
| --- | --- | --- | --- |
| 2.5° | 2.5° | 1.0 | A |
| | 7.5° | 0.73 | B |
| | 12.5° | 0.43 | C |
| | 17.5° | 0.18 | D |
| 7.5° | 2.5° | 0.76 | E |
| | 7.5° | 0.67 | F |
| | 12.5° | 0.48 | G |
| | 17.5° | 0.31 | H |
| | 22.5° | 0.13 | I |
| | 27.5° | 0.08 | J |
| 12.5° | 2.5° | 0.27 | K |
| | 7.5° | 0.24 | L |
| | 12.5° | 0.21 | M |
| | 17.5° | 0.15 | N |
| | 22.5° | 0.09 | O |
| | 27.5° | 0.06 | P |
| 17.5° | 2.5° | 0.12 | Q |
| | 7.5° | 0.11 | R |
| | 12.5° | 0.08 | S |
| | 17.5° | 0.06 | T |
| | 22.5° | 0.04 | U |
| | 27.5° | 0.03 | V |

Table 1 indicates that the left light-refracting surface section A should deviate the light rays 32 (FIGS. 6 and 7) generated by the corresponding light-emitting diode 12 and propagating therethrough so that the deviated light rays such as 37 leaving the light-refracting surface section A will propagate in a direction defining with the central horizontal optical axis 35 (FIGS. 6 and 7) of the lens 22, a vertical downward angle 36 (FIG. 6) of 2.5° and an horizontal left angle 38 (FIG. 7) of 2.5° toward a first spatial point (spatial zone or region) 39 (FIGS. 6 and 7) situated at a given distance from the light-refracting surface 26.

Those skilled in the art will appreciate that correction of the angles 36 and 38 may be required if the light rays refract and deviate upon propagation thereof through the light-propagating front wall 24 of FIG. 1.

In the same manner, Table 1 indicates that the right light-refracting surface section A deviates the light rays generated by the corresponding light-emitting diode 12 and propagating therethrough so that these light rays, when they leave the outer light-refracting surface 26 will propagate in a direction defining with the central horizontal optical axis 35 of the lens 22, a vertical downward angle of 2.5° and an horizontal right angle of 2.5° toward a second spatial point (spatial zone or region) situated at the given distance from the light-refracting surface 26.

Again, Table 1 indicates that the left light-refracting surface section B deviates the light rays generated by the corresponding light-emitting diode 12 and propagating therethrough so that the light rays, when they leave the outer light-refracting surface 26 will propagate in a direction defining with the central horizontal optical axis 35 of the lens a vertical downward angle of 2.5° and an horizontal left angle of 7.5° toward a third spatial point (spatial zone or region) situated at the given distance from the light-refracting surface 26.

Table 1 further indicates that the right light-refracting surface section B deviates the light rays generated by the corresponding light-emitting diode 12 and propagating therethrough so that these light rays, when they leave the outer light-refracting surface 26 will propagate in a direction defining with the central horizontal optical axis 35 of the lens 22, a vertical downward angle of 2.5° and an horizontal right angle of 7.5° toward a fourth spatial point situated at the given distance from the light-refracting surface 26.

Of course, Table 1 is read in the same manner for the other left and right light-refracting surface sections C–H.

To meet with the requirements of the Standard for Traffic Signal Lamps of the Institute of Transportation Engineers, the left and right light-refracting surface sections A–V have different dimensions to vary the light intensity at the different spatial points in accordance with the unit candlepower values given in Table 1.

Also, the annular regions 29 of all the lenses 22 of the array 21 are identical whereby the light rays propagating through the left light-refracting surface sections A of all the lenses 22 are deviated toward a common spatial point 39 and add at this spatial point 39. In the same manner, the light rays propagating through each left and right light-refracting surface section A of all the lenses 22 are deviated toward a corresponding common spatial point and add at this spatial point. Therefore, the light intensity at each spatial point can be easily adjusted through the number of light-emitting diodes and associated lenses in the two arrays 11 and 21 in the proportion given by the relative dimensions of the light-refracting surface sections A–H, to thereby respect the Standard for Traffic Signal Lamps of the Institute of Transportation Engineers.

However, it has been found convenient to use additional left and right light-refracting surface sections C, D and H formed on the central regions 28 of the outer light-refracting surfaces 26 of a given number of lenses 22 of the array 21 to increase the light intensity at the corresponding spatial points as required by the Standard for Traffic Signal Lamps of the Institute of Transportation Engineers. In the following description, these central regions will be referred to as a first type of central regions 28d.

Figures 14, 15:
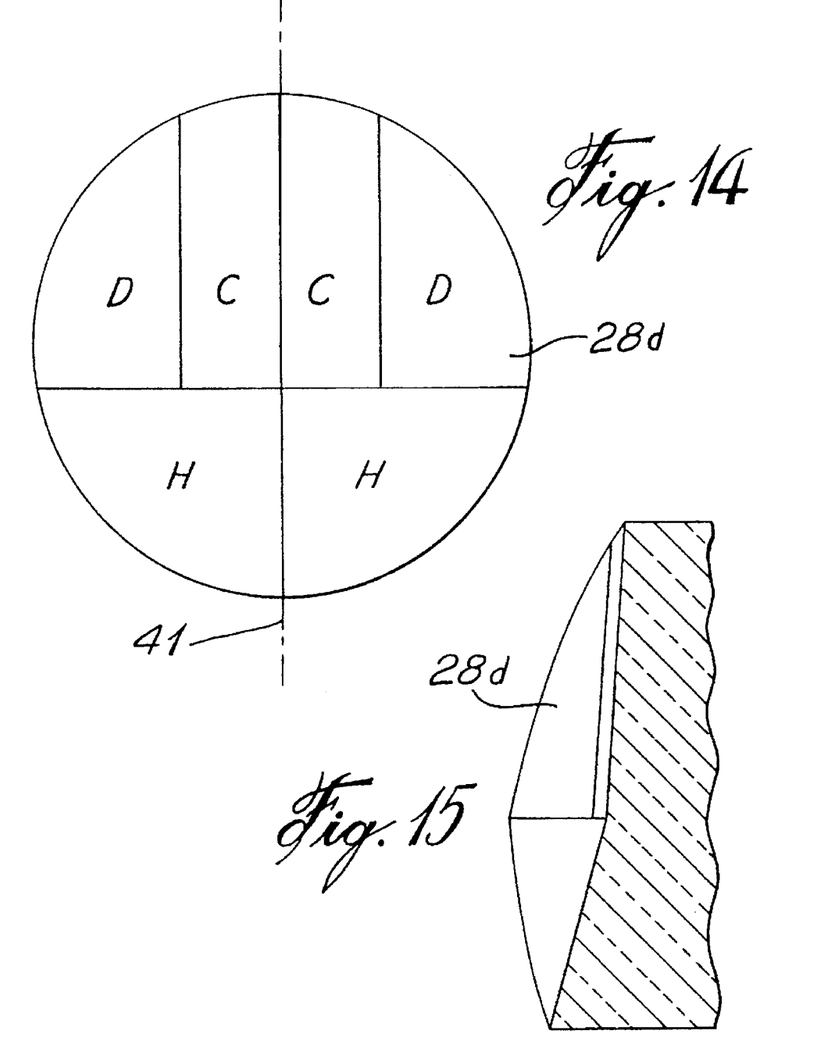
FIG. 14 is a front elevational view of a third type of central region of the outer light-refracting surface of the lens of FIGS. 3–5.
FIG. 15 is a side elevational, cross sectional view of the central region of FIG. 14.
Figure 16:
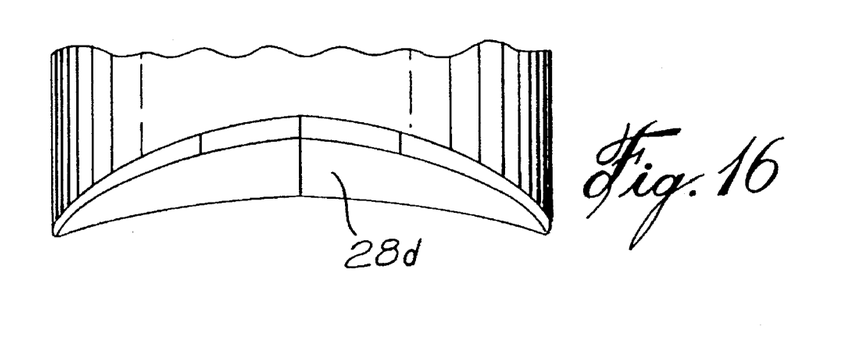
FIG. 16 is a cross sectional, top plan view of the central region of FIGS. 14 and 15.

As shown in FIGS. 14, 15 and 16, each central region 28d is divided into left upper light-refracting surface sections C and D, right upper light-refracting surface sections C and D, a left lower light-refracting surface section H, and a right lower light-refracting surface section H. As illustrated in FIG. 14, the left light-refracting surface sections C, D and H are symmetrical with respect to the right light-refracting surface sections C, D and H about a vertical central plane 41. The light-refracting surface sections C, D and H of the central regions 28d have different configurations (shape, orientation and position) in view of deviating the light rays 32 propagating therethrough toward the corresponding spatial points, respectively (see for example light rays 40 of FIGS. 6 and 7) to thereby adjust as required the light intensity at these points.

Table 1 also indicates that other spatial points (spatial zones or regions) I–V must also be illuminated to meet with the requirements of the Standard for Traffic Signal Lamps of the Institute of Transportation Engineers. The remaining central regions 28 of the lenses 22 of the array 21 are used for that purpose.

Figures 8, 9:
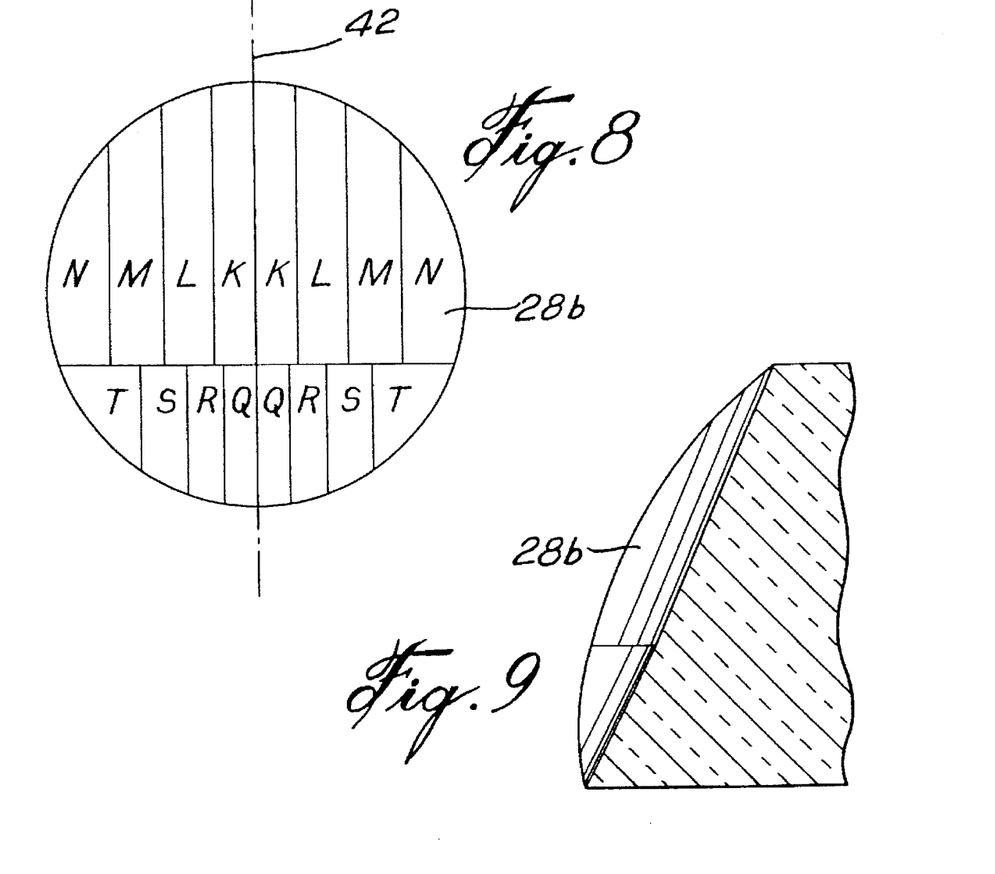
FIG. 8 is a front elevational view of a first type of central region of the outer light-refracting surface of the lens of FIGS. 3–5.
FIG. 9 is a side elevational, cross sectional view of the central region of FIG. 8.
Figure 10:
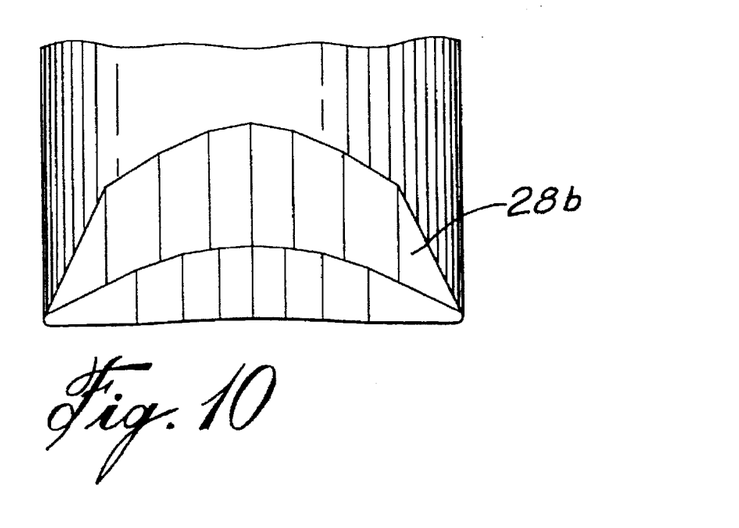
FIG. 10 is a cross sectional, top plan view of the central region of FIGS. 8 and 9.

A second type of central regions 28b is illustrated in FIGS. 8, 9 and 10. As shown, each central regions 28b is divided into left upper light-refracting surface sections K–N, right upper light-refracting surface sections K–N, left lower light-refracting surface sections Q–T, and right lower light-refracting surface sections Q–T. As illustrated in FIG. 8, the left light-refracting surface sections K–N and Q–T are symmetrical with respect to the right light-refracting surface sections K–N and Q–T about a vertical central plane 42. Again, the light-refracting surface sections K–N and Q–T of the central regions 28b have different configurations (shape, orientation and position) in view of deviating the light rays 32 propagating therethrough toward the corresponding spatial points, respectively.

Figure 11:
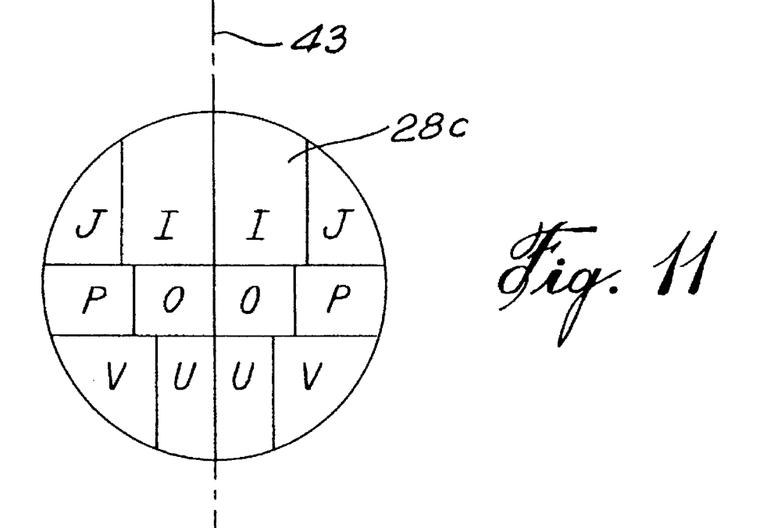
FIG. 11 is a front elevational view of a second type of central region of the outer light-refracting surface of the lens of FIGS. 3–5.
Figure 12:
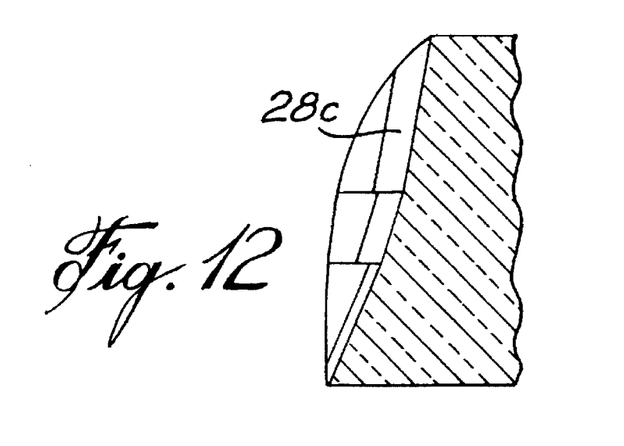
FIG. 12 is a side elevational, cross sectional view of the central region of FIG. 11.
Figure 13:
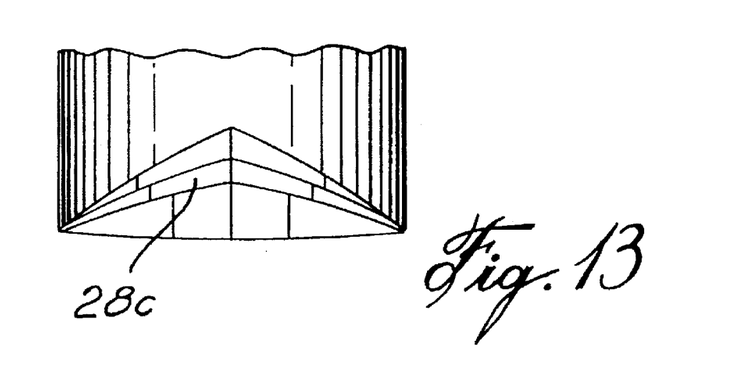
FIG. 13 is a cross sectional, top plan view of the central region of FIGS. 11 and 12.

A third type of central regions 28c is illustrated in FIGS. 11, 12 and 13. AS shown, each central region 28c is divided into left upper light-refracting surface sections I and J, right upper light-refracting surface sections I and J, intermediate left light-refracting surface sections O and P, intermediate right light-refracting surface sections O and P, left lower light-refracting surface sections U and V, and right lower light-refracting surface sections U and V. AS illustrated in FIG. 11, the left light-refracting surface sections I, J, O, P, U and V are asymmetrical with respect to the right light-refracting surface sections I, J, O, P, and V about a vertical central plane 43. Again, the light-refracting surface sections I, J, O, P, U and V of the central regions 28c have different configurations (shape, orientation and position) in view of deviating the light rays 32 propagating therethrough toward the corresponding spatial points, respectively.

Again, the left and right light-refracting surface sections K–V have different dimensions to vary the light intensity at the corresponding spatial points in accordance with the unit candlepower values given in Table 1, to thereby meet with the requirements of the Standard for Traffic Signal Lamps of the Institute of Transportation Engineers.

To facilitate manufacture of the array 21 of lenses 22, the central region 28 of each lens is formed on the free end of a pin protruding from the annular region 29 (FIGS. 1, 4, 5, 6 and 7). Such a lens can be called a double prismatic toroidal lens.

The central regions 28b, 28c and 28d of each type are uniformly distributed over the lenses 22 of the array 21. As an example, the array 21 contains 320 lenses 22 and the central regions 28 include 38% of central regions 28b, 16% of central regions 28c and 46% of central regions 28d to meet with the requirements of the Standard for Traffic Signal Lamps of the Institute of Transportation Engineers (Table 1).

Figures 4, 5:
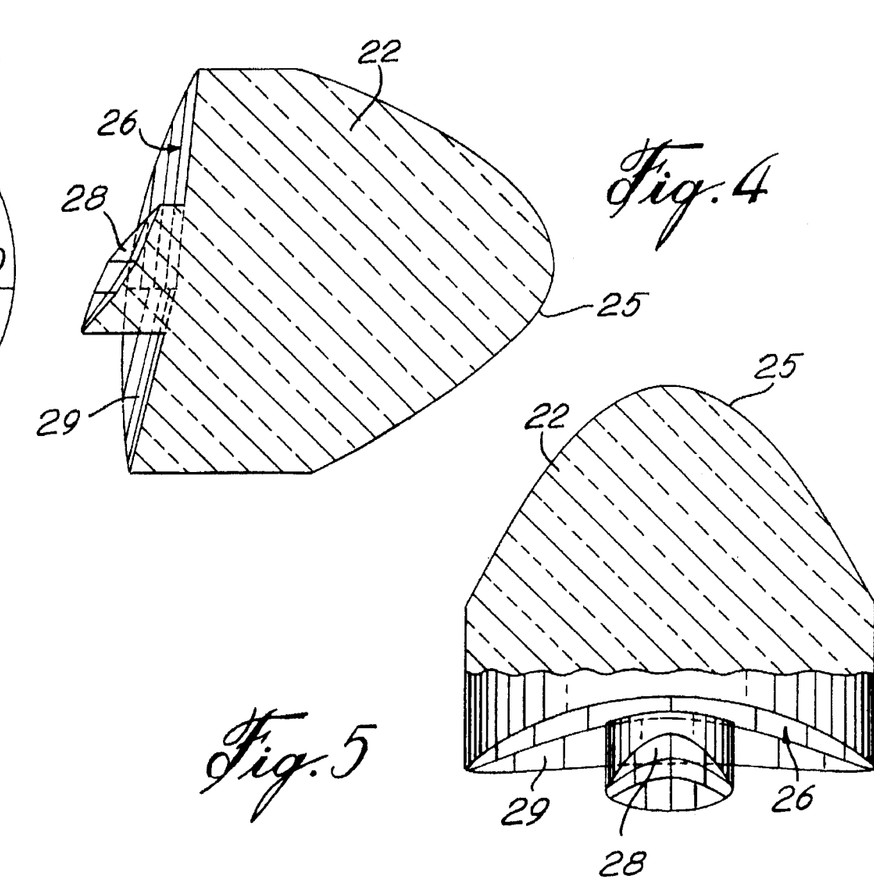
FIG. 4 is a side elevational, cross sectional view of the lens of FIG. 3.
FIG. 5 is a cross sectional, top plan view of the lens of FIGS. 3 and 4.
Figure 17:
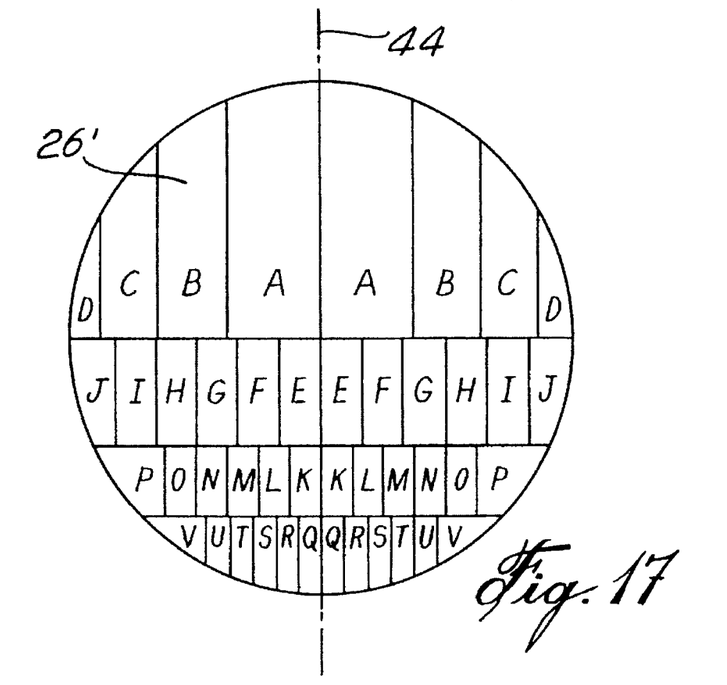
FIG. 17 is a front elevational view of another concept of lens that may be used to form the array of prismatic toroidal nonimaging lenses of the traffic signal light of FIG. 1.

As illustrated in FIG. 17, the light-refracting surface 26 of each lens 22 may also be formed of a single surface 26' having both a long radius convex cross section lying in a vertical plane and a short radius concave cross section lying in a horizontal plane (see for example annular region 29 in FIGS. 3–5). Each outer light-refracting surface 26' of the lenses 22 is then divided into left light-refracting surface sections A–V, and into right light-refracting surface sections A–V. As also illustrated in FIG. 17, the left light-refracting surface sections A–V are symmetrical with respect to the right light-refracting surface sections A–V about a vertical central plane 44. Each lens 22 is therefore a multiple section prismatic toroidal lens.

Again, the function of each light-refracting surface 26' is to deviate the light rays 32 (FIGS. 6 and 7) by refraction in view of forming a divergent light beam of larger horizontal dimension and of smaller vertical dimension. More specifically, the left and right light-refracting surface sections A–V of the light-refracting surface 26' of each lens 22 are respectively associated to the above defined predetermined, distinct spatial points and have different configurations (shape, orientation and position) for deviating the light rays 32 propagating through these left and right light-refracting surface sections A–V toward the corresponding spatial points, respectively.

To meet with the requirements of the Standard for Traffic Signal Lamps of the Institute of Transportation Engineers, the left and right light-refracting surface sections A–V have different dimensions and positions to vary the light intensity at the different spatial points in accordance with the unit candlepower values given in Table 1. More specifically, as illustrated in FIG. 17, the left and right light-refracting surface sections A–V are arranged into horizontal rows of laterally adjacent light-refracting surface sections, the dimensions of the light-refracting surface sections generally reducing from an upper row to a lower row.

Again, the light rays propagating through each left and right light-refracting surface section A–V of the lenses 22 are deviated toward a corresponding common spatial point and add at this spatial point. The light intensity at each spatial point can therefore be easily adjusted through the number of light-emitting diodes and associated lenses in the two arrays 11 and 21 in the proportion given by the relative dimensions of the light refracting surface sections A–V, to thereby meet with the requirement of the Standard for Traffic Signal Lamps of the Institute of Transportation Engineers.

A drawback of the embodiment of FIG. 17 is that smaller surface sections have to be shaped to make manufacture of this embodiment more difficult.

Also the surface sections of the different light-refracting surface can be approximated by a continuous concave surface.

It is also within the scope of the present invention to replace the light-emitting diodes by other generally directional light sources such as, for example, optical fibers.

Although the present invention has been described hereinabove by way of a preferred embodiment thereof, this embodiment can be modified at will, within the scope of the appended claims, without departing from the spirit and nature of the subject invention.

What is claimed is:

1. An apparatus for illuminating a plurality of predetermined, distinct spatial points with respective, predetermined light intensities, comprising:

an array of light sources for producing respective light rays; and an array of lenses each associated with a corresponding one of said light sources;

wherein;

(a) said lenses each comprise a solid body of light-propagating material defining a light-refracting surface through which the light rays from the corresponding light source propagate;

(b) said light-refracting surface is divided into light-refracting surface sections each associated with a corresponding one of said spatial points;

(c) said light-refracting surface sections have different configurations in view of deviating the light rays propagating through said light-refracting surface sections toward the corresponding spatial points, respectively;

(d) said lenses comprise a plurality of said light-refracting surface sections associated to each spatial point whereby the light rays deviated by said plurality of light-refracting surface sections add at the associated spatial point;

(e) said plurality of light-refracting surface sections associated to each spatial point comprises a given number of said light-refracting surface sections each having a given area, said given number and said given area being selected in view of illuminating the associated spatial point with the predetermined light intensity; and (f) said plurality of light-refracting surface sections associated to each spatial point are distributed onto a plurality of said lenses to extend an illuminated portion of said array apparent from said spatial point.

2. The apparatus of claim 1, wherein said light-refracting surface has a first radius and a second radius, said second radius being larger than said first radius, concave cross sections lying in respective, substantially perpendicular planes.

3. The apparatus of claim 2, wherein said light-refracting surface is both prismatic and toroidal.

4. The apparatus of claim 1, wherein said light-refracting surface sections have different dimensions to adjust the light intensity at each spatial point.

5. The apparatus of claim 1, wherein said solid body defines on the side of the corresponding light source a light-collimating surface for collimating the light rays from the corresponding light source, and wherein said light-refracting surface is situated on the side of the solid body opposite to the corresponding light source.

6. The apparatus of claim 5, in which said light-collimating surface is convex and wherein said light-refracting surface is concave.

7. The apparatus of claim 1, wherein said array of lenses is a one-piece array made of molded plastic material and in which said lenses define a honeycomb arrangement.

8. The apparatus of claim 1, wherein said light-refracting surface is formed of a central region and an annular region surrounding said central region, said light-refracting surface sections being distributed on both said central and annular regions of the light-refracting surface.

9. The apparatus of claim 8, in which the annular regions of the light-refracting surfaces of the different lenses are identical, and wherein the light-refracting surfaces of the lenses comprise different types of central regions distributed over the array of lenses.

10. The apparatus of claim 8, wherein the central region of the light-refracting surface of each lens protrudes from the annular region of the same light-refracting surface.

11. A traffic signal light comprising:

an array of light-emitting diodes for producing respective light rays; and an array of lenses for propagating light rays from said light-emitting diodes toward a plurality of predetermined, distinct spatial points in order to illuminate each of said spatial points with a predetermined light intensity, said spatial points and said predetermined light intensity forming part of a standard to be met by traffic signal lights;

wherein:

(a) said lenses of the array are each associated with a corresponding one of said light-emitting diodes;

(b) said lenses each comprise a solid body of light-propagating material defining a light-refracting surface through which the light rays from the corresponding light-emitting diode propagate;

(c) said light-refracting surface is divided into light-refracting surface sections each associated with a corresponding one of said spatial points;

(d) said light-refracting surface sections have different configurations in view of deviating the light rays propagating through said light-refracting surface sections toward the corresponding spatial points, respectively;

(e) said lenses comprise a plurality of said light-refracting surface sections associated to each spatial point whereby the light rays deviated by said plurality of light-refracting surface sections add at the associated spatial point;

(f) said plurality of light-refracting surface sections associated to each spatial point comprises a given number of said light-refracting surface sections each having a given area, said given number and said given area being selected in view of illuminating the associated spatial point with the predetermined light intensity; and (f) said plurality of light-refracting surface sections associated to each spatial point are distributed onto a plurality of said lenses to extend an illuminated portion of said array apparent from said spatial point.

12. The traffic signal light of claim 11, wherein said light-refracting surface has a first radius concave cross section lying in a generally horizontal plane and a second radius, said second radius being larger than said first radius, concave cross section lying in a substantially vertical plane.

13. The traffic signal light of claim 12, wherein said light-refracting surface is both prismatic and toroidal.

14. The traffic signal light of claim 11, wherein said light-refracting surface sections have different dimensions to adjust the light intensity at each spatial point.

15. The traffic signal light of claim 11, wherein said solid body defines on the side of the corresponding light-emitting diode a light-collimating surface for collimating the light rays from the corresponding light-emitting diode, and wherein said light-refracting surface is situated on the side of the solid body opposite to the corresponding light-emitting diode.

16. The traffic signal light of claim 15, in which said light-collimating surface is convex and generally parabolic, and wherein said light-refracting surface is concave.

17. The traffic signal light of claim 11, wherein said array of lenses is a one-piece array made of molded plastic material and in which said lenses define a honeycomb arrangement.

18. The traffic signal light of claim 11, wherein said light-refracting surface is formed of a central region and an annular region surrounding said central region, said light-refracting surface sections being distributed on both said central and annular regions of the light-refracting surface.

19. The traffic signal light of claim 18, in which the annular regions of the light-refracting surfaces of the different lenses are identical, and wherein the light-refracting surfaces of the lenses comprise different types of central regions distributed over the array of lenses.

20. The traffic signal light of claim 18, wherein the central region of the light-refracting surface of each lens protrudes from the annular region of the same light-refracting surface.

* * * * *